(12) United States Patent
Denpo

(10) Patent No.: US 6,515,806 B2
(45) Date of Patent: Feb. 4, 2003

(54) EYEPIECE ATTACHMENT STRUCTURE FOR OBSERVATION OPTICAL INSTRUMENT

(75) Inventor: Atsushi Denpo, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/794,365

(22) Filed: Feb. 28, 2001

(65) Prior Publication Data

US 2001/0019459 A1 Sep. 6, 2001

(30) Foreign Application Priority Data

Mar. 1, 2000 (JP) .......................... 2000-056080

(51) Int. Cl.[7] .......................... G02B 15/14; G02B 7/02; G02B 27/00
(52) U.S. Cl. .................. 359/694; 359/894; 359/830
(58) Field of Search ................... 359/894, 819, 359/830, 363, 368, 694

(56) References Cited

U.S. PATENT DOCUMENTS

| | | | | |
|---|---|---|---|---|
| 5,079,646 A | * | 1/1992 | Schwartz | 359/894 |
| 5,772,680 A | * | 6/1998 | Kieturakis et al. | 606/190 |
| 5,877,892 A | | 3/1999 | Nakamura et al. | 359/426 |
| 6,130,785 A | | 10/2000 | Abe et al. | 359/646 |

* cited by examiner

Primary Examiner—Huy Mai
Assistant Examiner—Tim Thompson
(74) Attorney, Agent, or Firm—Greenblum & Bernstein, P.L.C.

(57) ABSTRACT

An eyepiece attachment structure for attaching an eyepiece to an observation optical instrument is provided with an attaching sleeve protruding from the eyepiece, a holding member secured to the body, the holding member frictionally holding the attaching sleeve when the attaching sleeve is inserted in the observation optical instrument, and a rotation preventing mechanism that mechanically prevents rotation of the attaching sleeve relative to the holding device when the attaching sleeve is inserted into the observation optical instrument.

12 Claims, 13 Drawing Sheets

EYEPIECE ATTACHMENT STRUCTURE FOR OBSERVATION OPTICAL INSTRUMENT

BACKGROUND OF THE INVENTION

The present invention relates to an eyepiece attachment structure for an observing optical instrument.

The prior art includes an observing optical instrument such as a telescope employing a collet type attachment structure for removably attaching an eyepiece to a body of the observing optical instrument. The collet type attachment structure is configured such that the eyepiece includes an attaching sleeve generally cylindrically formed, and the body of the observing optical instrument is provided with a holding ring that receives and presses an outer circumferential surface of the attaching sleeve so that the eyepiece is frictionally engaged and fixed to the body.

However, if the eyepiece is a zooming type one, magnification of which is changeable by rotating a zooming ring provided thereto, when the zooming ring is rotated in a circumferential direction, the rotation torque prevails against the frictional engagement of the attaching sleeve with the holding ring, and the attaching sleeve is rotated with respect to the body.

SUMMARY OF THE INVENTION

It is therefore an object of the invention to provide an improved eyepiece attachment structure for an observing optical instrument, with which an eyepiece can be securely attached to the observing optical instrument and which allows easy detachment.

For the above object, according to the invention, there is provided an eyepiece attachment structure for attaching an eyepiece to an observation optical instrument, which is provided with a cylindrical attaching sleeve protruding from the eyepiece, a holding member secured to the body, the holding member frictionally holding the attaching sleeve when the attaching sleeve is inserted into the observation optical instrument, and a rotation preventing mechanism that mechanically prevents rotation of the attaching sleeve relative to the holding device when the attaching sleeve is inserted into the observation optical instrument.

With the above configuration, the eyepiece does not rotate while the eyepiece is movable in the axial direction.

Optionally, the holding member includes an elastically constrictable holding ring in which said attaching sleeve is inserted, an operating ring that is engageable with said holding ring, said holding ring being constricted upon operation of said operating ring, and a protecting element provided inside said holding ring, said protecting element frictionally engaging with said attaching sleeve when said holding ring is constricted.

Optionally, the rotation preventing mechanism may be provided with at least one rotation preventing groove provided on one of the eyepiece and the body, and at least one rotation preventing pin engageable with the at least one rotation preventing groove, the at least one rotation preventing pin being provided on the other one of the eyepiece and the body.

In this case, the at least one rotation preventing pin may be provided on the body, the at least one rotation preventing pin projecting inward in a radial direction of the holding member. Further, the at least one rotation preventing groove is formed at a front end portion of the attaching sleeve by cutting at least one portion of its outer circumferential surface.

Further optionally, another eyepiece having another attaching sleeve may be attachable with the attachment structure, the length of the another attaching sleeve along its axis being shorter than that of the attaching sleeve, and the another attaching sleeve does not interfere with the rotation preventing pin in an axial direction.

Alternatively, the rotation preventing pin may be movable between a locked position, at which the at least one rotation preventing pin engages the at least one rotation preventing groove, and an unlocked position, at which the at least one rotation preventing pin does not engage the at least one rotation preventing groove, and the eyepiece attachment structure may include a biasing means that biases the rotation preventing pin to be neutrally located at the locked position.

In this case, the rotation preventing pin may be movable in the radial direction of said holding member to locate between said locked position and said unlocked position, with being biased to neutrally locate at the locked position. Another eyepiece having another attaching sleeve is attachable with the attachment structure. The another attaching sleeve may be provided with a pin-lifting surface, which lifts the rotation preventing pin being to locate at the unlocked position upon insertion thereof into the holding member. With this configuration, an attaching sleeve which is not formed with the rotation preventing groove can be inserted in the observation optical instrument for use, without interfered by the rotation preventing pin.

Still optionally, the at least one rotation preventing groove may include a plurality of slits formed on the holding ring which enable the holding ring to be elastically constricted, and the rotation preventing pin may be provided on one of the attaching sleeve and a member integrally formed with the attaching sleeve.

In the above case, the at least one rotation preventing pin may be movable between a locked position, at which the at least one rotation preventing pin engages the at least one rotation preventing groove, and an unlocked position, at which the at least one rotation preventing pin does not engage the at least one rotation preventing groove, and the eyepiece attachment structure may include a biasing means that biases the rotation preventing pin to be neutrally located at the locked position.

Further, the rotation preventing pin may be movable in a direction parallel to an insertion/withdrawal direction of the attaching sleeve with respect to the body.

Still optionally, the eyepiece may be provided with a fixed cylinder integrally formed with the attaching sleeve, and a rotatable ring manually operable from outside. The rotatable ring may preferably be rotatably supported by the fixed cylinder.

In this case, the rotatable ring may be a zooming operation ring, upon operation of which, magnification-varying lens groups, supported in the eyepiece, may move along an optical axis to vary the focal length of the eyepiece.

DESCRIPTION OF THE EMBODIMENTS

The invention will be more clearly understood by reference to the following description of preferred embodiments thereof read in conjunction with the figures attached hereto. In the figures, identical structures, elements or parts that appear in more than one figure are labeled with the same numeral in all the figures in which they appear.

In this specification, an objective side along an optical axis is referred to a "front side", and an eyepiece side is referred to as a "rear side". Further, the terms "forward" and "backward" are referred to as "toward the front side" and "toward the rear side", respectively.

Figure 1:
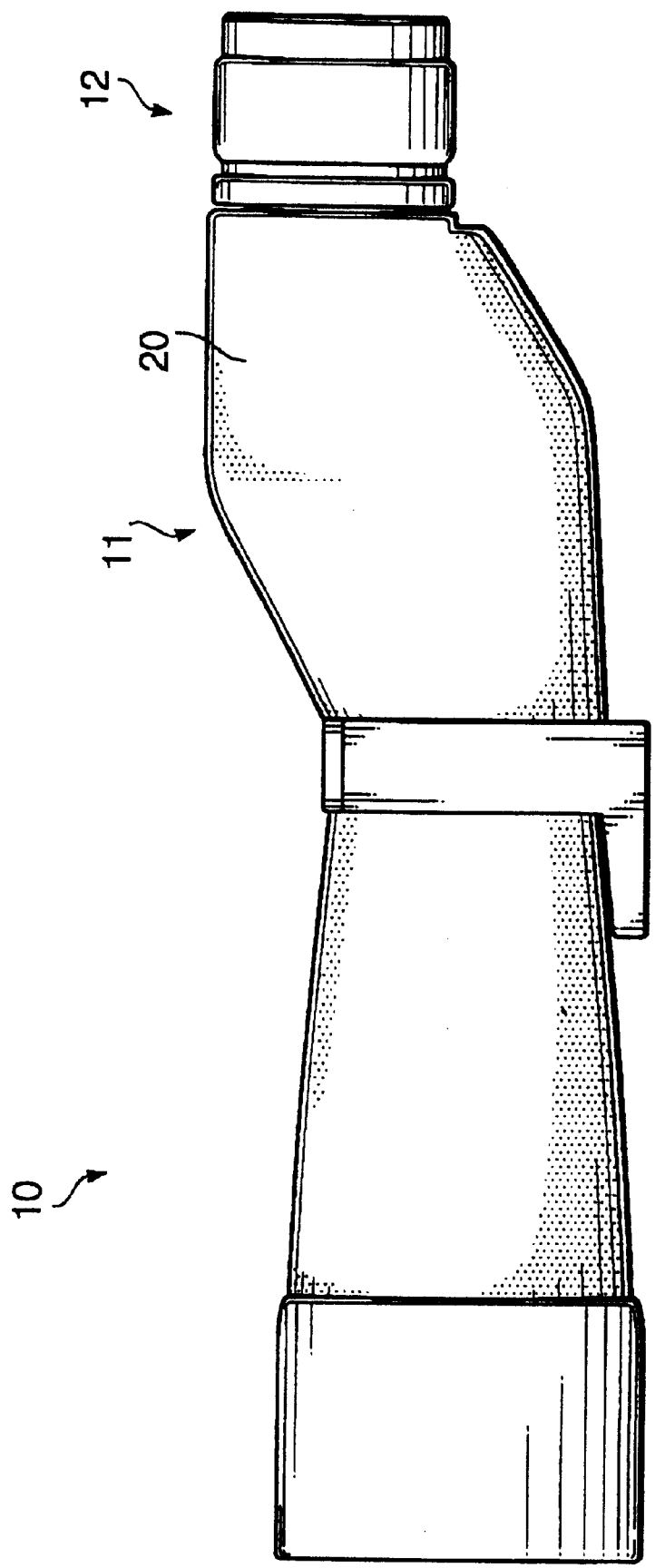
FIG. 1 shows a side view of a spotting scope to which eyepiece attachment structures according to an embodiment of the invention are applicable.

FIG. 1 shows a side view of a spotting scope 10, or a terrestrial telescope, as an example of an optical instrument, employing an eyepiece attachment structure according to the invention. The spotting scope 10 includes a scope body 11 containing an objective optical system (not shown), and an eyepiece 12 containing an eyepiece optical system. The eyepiece 12 is removably attached to the scope body 11.

FIG. 2 to FIG. 5 show an eyepiece attachment structure according to a first embodiment of the invention, with which either a zooming type eyepiece 12Z or a fixed-focus type eyepiece 12N (see FIG. 5) can be removably attached to the scope body 11.

Firstly, a mechanism provided in the scope body 11 will be described. The scope body 11 contains a body housing 20. The body housing 20 has a fixing cylinder 21 securely fixed inside the rear part of the body housing 20. A holding ring 22 is securely screw-coupled to the rear side portion of the fixing cylinder 21. The holding ring 22 supports an operating ring 24 via a moving screw 23 therebetween. The operating ring 24 is rotatable with respect to the holding ring 22 along the moving screw 23 such that the operating ring 24 moves in parallel to the optical axis as it is rotated.

Figure 2:
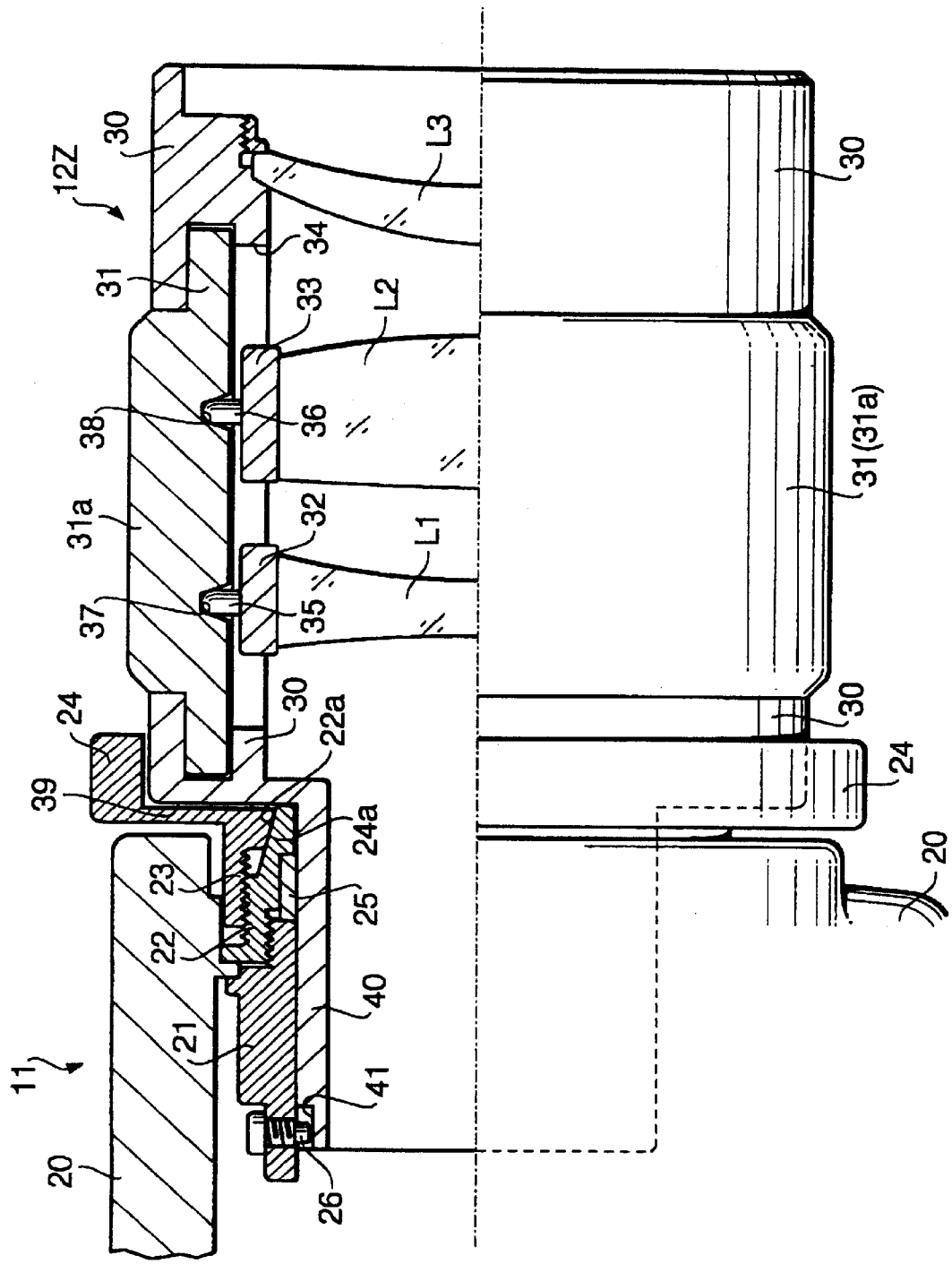
FIG. 2 shows a side view with an upper side cross-sectioned of a first embodiment of an eyepiece attachment structure, with a zooming type eyepiece attached to the spotting scope.

The outer rear portion of the holding ring 22 is tapered to form a pressed surface 22a as shown in FIG. 2. The holding ring 22 is made of metal having elasticity.

Corresponding to the pressed surface 22a, an inner surface of the operating ring 24 is tapered as shown in FIG. 2 to form a pressing surface 24a. The pressed surface 22a and the pressing surface 24a are formed such that the pressing force of the pressing surface 24a against the pressed surface 22a increases when the operating ring 24 is rotated and moved toward the front side (i.e., the left-hand side in the drawing).

The holding ring 22 is formed with a plurality of slits, which extend in a direction parallel to the axis thereof, at the rear end portion along its circumferential direction. Thus, when the operating ring 24 is rotated to move in the front side direction, due to the engagement between the pressing surface 24a and the pressed surface 22a, the rear end portion of the holding ring 22 is constricted and the inner diameter of the rear end portion of the holding ring 22 is reduced. Since the holding ring 22 is formed of elastic material, when the operating ring 24 is operated to move toward the rear side, the inner diameter of the rear end portion of the holding ring 22 returns to its original size.

An element 25 in the drawings denotes a protecting element made of resin, or the like. The protecting element 25 is fitted in the holding ring 22. The inner diameter of the protecting element 25 is substantially the same as that of the fixing cylinder 21, while the inner diameter of the holding ring 22 is slightly larger than that of the fixing cylinder 21.

When the operating ring 24 is operated to constrict the holding ring 22, the protecting element 25 is urged so as to reduce its diameter, while when the pressing force from the holding ring 22 to the protecting element 25 is released, the inner diameter of the protecting element 25 returns to its original size.

An attaching sleeve 40 of the eyepiece 12, which will be described in detail later, is fitted in the protecting element 25 and the fixing cylinder 21. When the operating ring 24 is operated to move forward, the holding ring 22 is constricted, and the protecting element 25 is also constricted, thereby securely holding the attaching sleeve 40. When the operating ring 24 is operated to move rearward, the holding force of the protecting element 25 is released, and the attaching sleeve 40 becomes retractable from the fixing cylinder 21 and the protecting element 25.

A rotation preventing pin 26 is provided, projecting inward along a radial direction, at a front end portion of the fixing cylinder 21. The rotation preventing pin 26 is disposed at an arbitrary circumferential position on the inner surface of the fixing cylinder 21. The rotation preventing pin 26 can prevent rotation of the eyepiece 12Z, which will be described later in detail.

Next, an attachment structure provided to the zooming type eyepiece 12Z will be described. The eyepiece 12Z includes an inner fixed cylinder 30 and an outer rotating ring 31. The fixed cylinder 30 and the outer rotating ring 31 are coupled such that they are rotatable with respect to each other, but not movable in a direction of the optical axis with respect to each other. A portion of the outer rotating ring 31 is exposed to outside and functions as a zooming operating member 31a.

In the fixed cylinder 30, a first lens group L1, a second lens group L2 and a third lens group L3 are supported, in this order from an object side, to constitute an eyepiece optical system. The third lens group L3 is fixed in the vicinity of the rear end of the fixed cylinder 30, and is unmovable in the optical axis direction. The first and the second lens groups L1 and L2 constitute a magnification-varying lens group, and are movable in the optical axis direction. The lens groups L1 and L2 are respectively supported by supporting frames (not shown), from which guiding projections 32 and 33 protrude outward, respectively.

Guiding grooves 34, which are parallel to the optical axis, are formed on the inner surface of the fixed ring 30. The guiding projections 32 and 33 are slidably engaged in the guiding grooves 34. The engagement of the guiding projections 32 and 33, with the guiding groove 34, enables the first lens group L1 and the second lens group L2 to move only in the optical axis direction with respect to the fixed cylinder 30, and prevents rotation thereof. Although only one pair of guiding projections 32 and 33 and one guiding groove 34 are shown in the drawings, a plurality of sets of the guiding projections 32 and 33 and the guiding grooves 34 may be provided at different circumferential positions.

Cam pins 35 and 36 are provided respectively on guiding projections 32 and 33, projecting outward in the radial direction of the lens frames thereof. Cam grooves 37 and 38 are formed, on an inner surface of the rotating ring 31, for respectively receiving the cam pins 35 and 36. The cam groove 37 and the cam groove 38 have generally different profiles from each other such that the first lens group L1 and the second lens group L2 move along different loci as the rotating ring 31 is rotated. Although only one cam groove 37 and one come groove 38 respectively for the lens groups L1 and L2 are illustrated in the drawings for clarity, there are generally a plurality of grooves are formed.

When the zooming operation member 31a is rotated with respect to the fixed ring 30, the lens groups L1 and L2 respectively trace generally different loci, and the lens groups L1 and L2 move in the direction of the optical axis, guided by the guiding groove 34. By this movement of the lens groups L1 and L2, a focal length of the eyepiece optical system is changed so that a magnifying-power of the spotting scope 10 can be varied. It should be noted that the structure of the zooming mechanism in the eyepiece is not limited to the structure mentioned above.

An insertion stopping surface 39 is formed, as a portion of the fixed cylinder 30, at a front portion of the eyepiece 12Z. The insertion stopping surface 39 extends in a direction perpendicular to the optical axis. From a plane of the insertion stopping surface 39, the attaching sleeve 40, which is formed integrally with the fixed cylinder 30, protrudes toward the front side (i.e., the left-hand side of FIG. 2).

The centerline of the attaching sleeve 40 along the longitudinal direction coincides with the optical axis. The attaching sleeve 40 is generally made integral with the fixed cylinder 30, but, may be made separately.

When the attaching sleeve 40 is inserted into the scope body 11, the insertion stopping surface 39 contacts a rear end of the holding ring 22 and stops the insertion.

Figure 3:
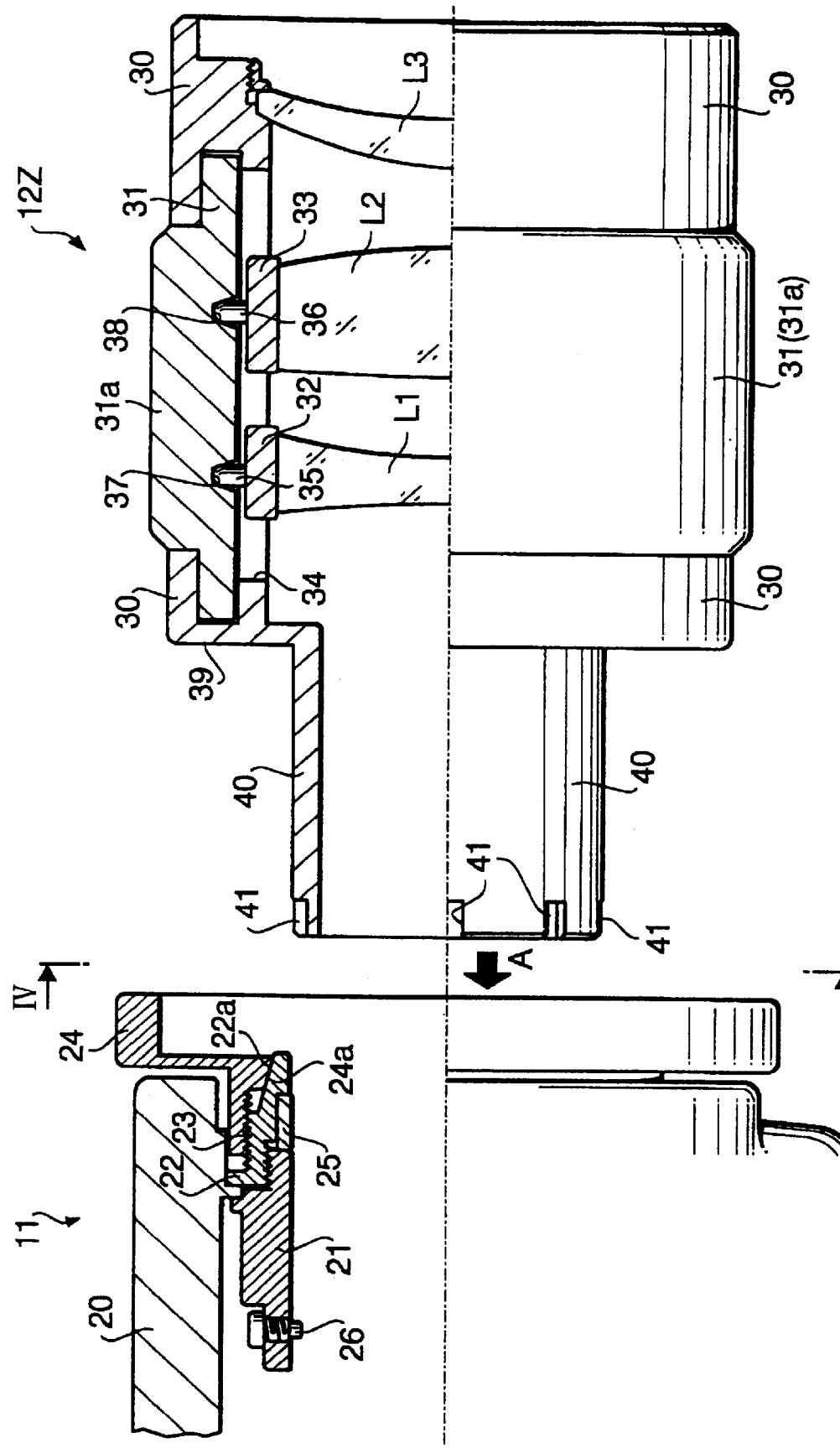
FIG. 3 shows the side view with the upper side cross-sectioned of the eyepiece attachment structures, with the eyepiece detached from the spotting scope.
Figure 4:
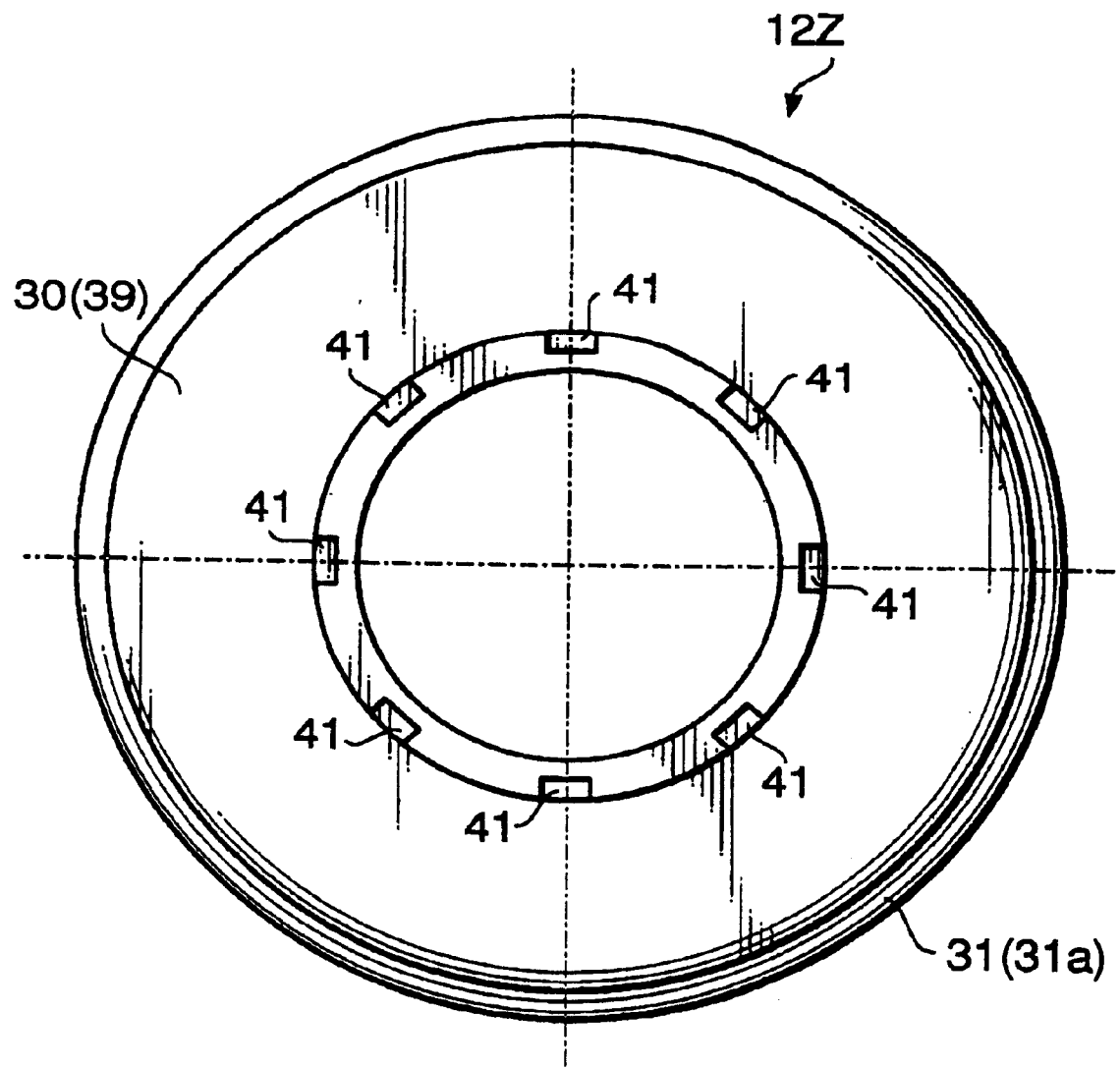
FIG. 4 shows a front view of the eyepiece shown in FIG. 2 and FIG. 3.

As shown in FIG. 2 to FIG. 4 (most clearly shown in FIG. 4), eight rotation preventing grooves 41 are formed by cutting eight front-end portions of an outer circumferential surface of the attaching sleeve 40. One of the rotation preventing grooves 41 engages with the rotation preventing pin 26 provided on the scope body 11. The axial length of the attaching sleeve 40 from the insertion stopping surface 39 is designed so that the rotation preventing grooves 41 engages the rotation preventing pin 26 when the insertion stopping surface 39 contacts the rear end of the holding ring 22. Once the attaching sleeve 40 is fully inserted in the fixing cylinder 21, due to the engagement of a rotation preventing groove 41 and the rotation preventing pin 26, the attaching sleeve 40 is prevented from rotating.

The eyepiece 12Z is detached from and attached to the scope 11 as follows. FIG. 3 shows a case where the eyepiece 12Z is detached from the scope body 11. The eyepiece 12Z is moved in a direction of arrow A, i.e., is moved forward, when the eyepiece 12A is to be attached. The attaching sleeve 40 is inserted into the scope body 11, until the insertion stopping surface 39 abuts against the rear end of the holding ring 22, and the rotation preventing pin 26 engages with a rotation preventing groove 41 (see FIG. 2).

If the front side end of the attaching sleeve 40 contacts the rotation preventing pin 26, then none of the rotation preventing grooves 41 engages the rotation preventing pin 26. In such a case, since eight rotation preventing grooves 41 are formed at equal intervals in the circumferential direction, only the rotation of the eyepiece 12Z by less than 45 degrees, at the largest, enables the pin 26 to engage with one of the eight rotation preventing grooves 41.

After the attaching sleeve 40 is fully inserted in the fixing cylinder 21, the operation ring 24 is rotated in a tightening direction, i.e., the direction in which the operation ring 24 moves forward along the optical axis. As the operation ring 24 moves forward, the pressing surface 24a presses the pressed surface 22a, and therefore the holding ring 22 contracts. Then, the protecting element 25 is pressed by the holding ring 22, and therefore presses the attaching sleeve 40 thereof. With this structure, frictional engagement between the protection element 25 and the attaching sleeve 40 is established, which prevents the eyepiece 12Z from retracting from the scope body 11. In this state, as described above, due to the engagement of the rotation preventing pin 26 and a rotation preventing groove 41, the attaching sleeve 40 is prevented from rotating with respect to the fixing cylinder 21.

The eyepiece 12Z can be removed from the scope body 11 by rotating the operation ring 24 in the loosening direction, which makes the operation ring 24 move rearward along the optical axis. With this movement of the operation ring 24, the holding ring 22 expands to release the pressing force of the pressing surface 24a to the pressed surface 22a, which releases the pressing force of the protecting element 25 to the attaching sleeve 40, and the eyepiece 12Z can be withdrawn from the fixing cylinder 21.

A zooming operation, whit the eyepiece attached, does not cause the eyepiece 12Z to rotate with respect to the body 11, according to the embodiment of the invention. The engagement of the rotation preventing pin 26 with the rotation preventing groove 41 prevents the attaching sleeve 40 from rotating. Further, the attaching sleeve 40 is formed integrally with or securely coupled to the fixed cylinder 30, the fixed cylinder 30 is also prevented from rotating with respect to the scope body 11. Only the rotating ring 31 is allowed to rotate with respect to the scope body 11. Therefore, even when the rotating ring 31 is rotated for zooming, the fixed cylinder 30 does not rotate, which provides a good operational feeling.

Although the eight rotation preventing grooves 41 are formed on the attaching sleeve 40 to improve the operability in the above-described embodiment, only one rotation preventing groove 41 may be sufficient for preventing the rotation of the fixed cylinder 30.

As mentioned above, the eyepiece attachment structure according to the embodiment can prevent the rotation of the eyepiece 12Z when attached, and can provide a simple operation of attachment and removal.

The attachment structure described above does not affect attaching of the non-zooming type eyepiece.

Figure 5:
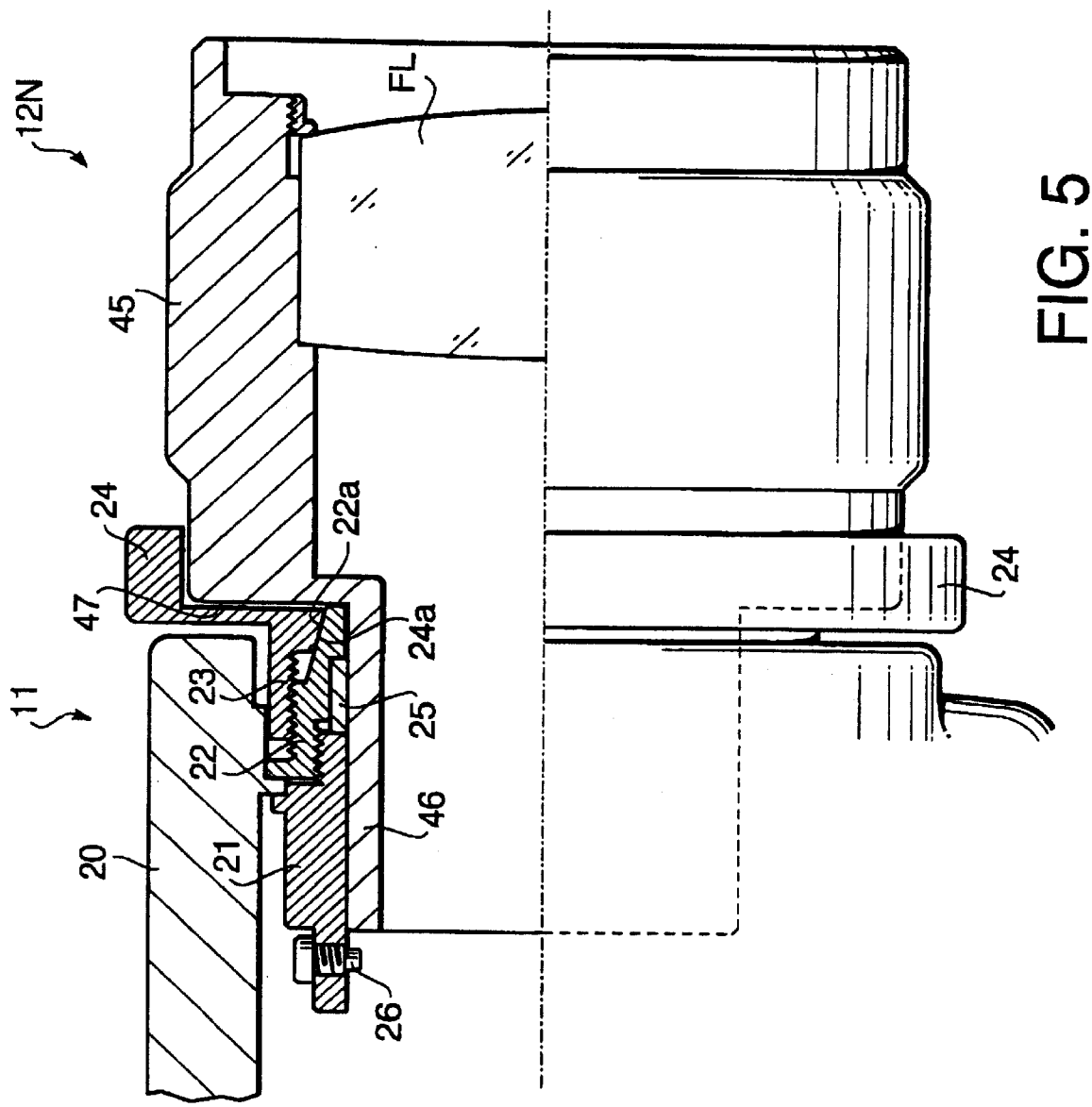
FIG. 5 shows the side view with the upper side cross-sectioned of the eyepiece attachment structure according to the first embodiment, with a non-zooming type eyepiece attached.

An eyepiece 12N shown in FIG. 5 is a non-zooming type (i.e., a fixed-focus type) eyepiece. The fixed-focus type eyepiece 12N includes an eyepiece body 45 having an eyepiece lens FL (eyepiece optical system), and an attaching sleeve 46 extending forward from the eyepiece body 45.

The axial length of the attaching sleeve 46, which length is defined as a length measured from a plane of an insertion stopping surface 47, is shorter than that of the attaching sleeve 40 of the eyepiece 12Z. When the insertion stopping surface 47 abuts against the rear end of the holding ring 22, and the insertion of the eyepiece 12N with respect to the scope body 11 is restricted, the front end of the attaching sleeve 46 does not reach the rotation preventing pin 26. Therefore, even if the eyepiece 12N is fully inserted in the fixing cylinder 21, the rotation preventing pin 26 and the attaching sleeve 46 do not interfere with each other. If the operation ring 24 is rotated in a direction where the holding ring 22 constricts after the eyepiece 12N is inserted, the protecting element 25 is pressed so that it presses the attaching sleeve 46, causing frictional engagement therebetween for secure attachment. Because the eyepiece 12N does not include a rotation operating element, a circumferential rotation torque can be regarded so small that the eyepiece 12N can be fixed only by the frictional engagement therebetween, even though the rotation preventing pin 26 is not engaged.

When the eyepiece 12N is removed, the operating ring 24 is rotated in the loosening direction to release the frictional engagement, before the eyepiece 12N is withdrawn backward.

Figure 6:
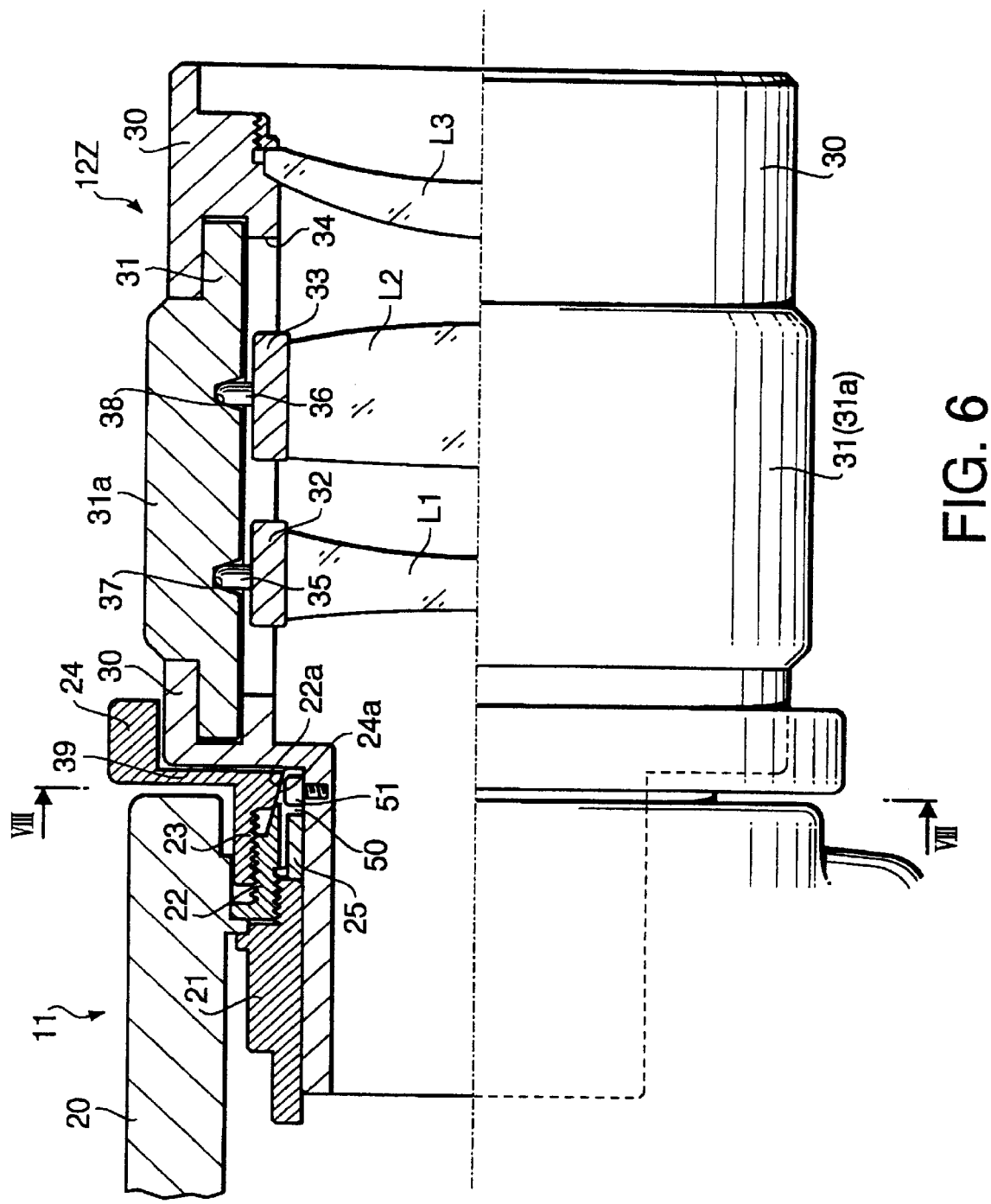
FIG. 6 shows a side view, with an upper side cross-sectioned, of a second embodiment of an eyepiece attachment structure, with a zooming type eyepiece attached.
Figure 7:
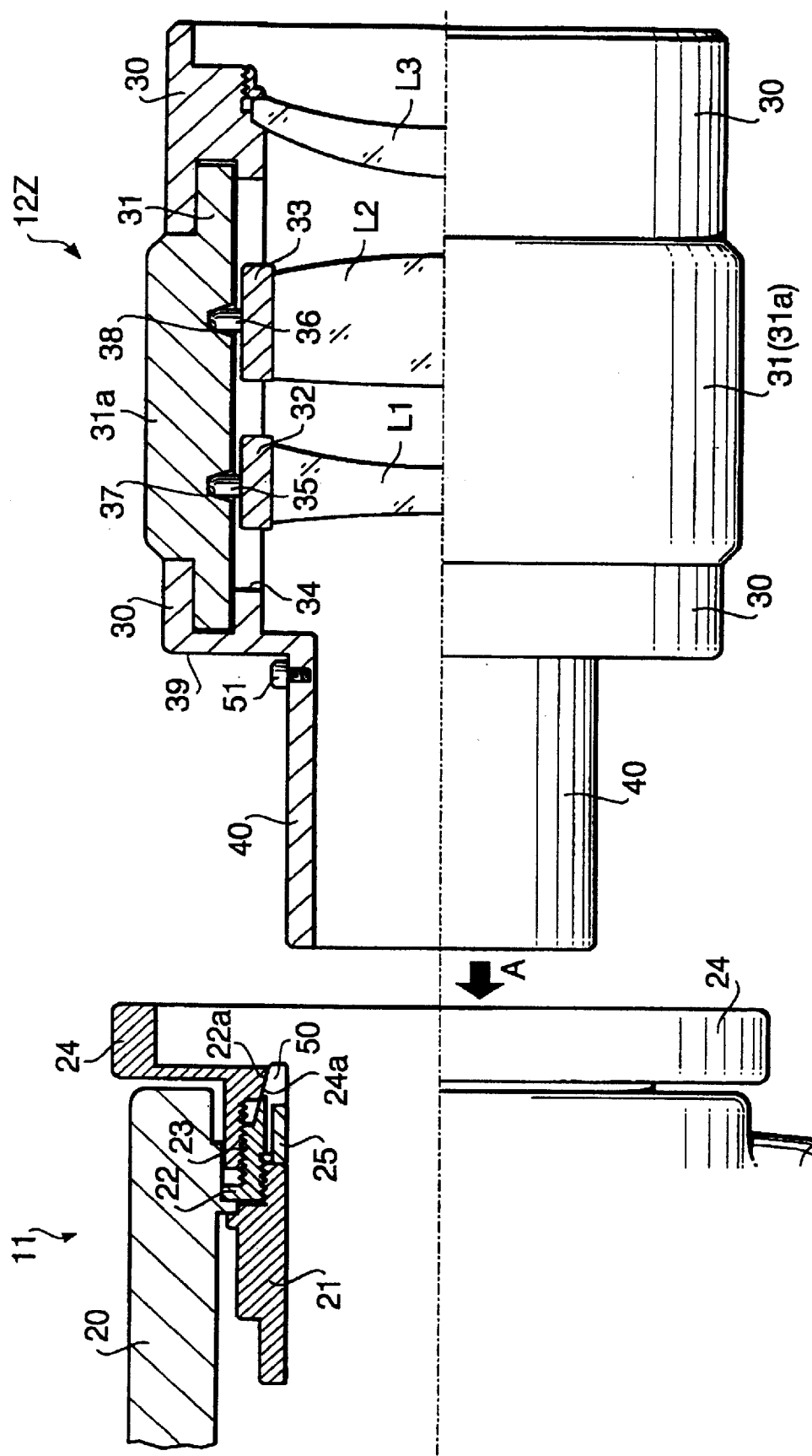
FIG. 7 shows the side view, with the upper side cross-sectioned, of the eyepiece attachment structure, the zooming type eyepiece being detached.
Figure 8:
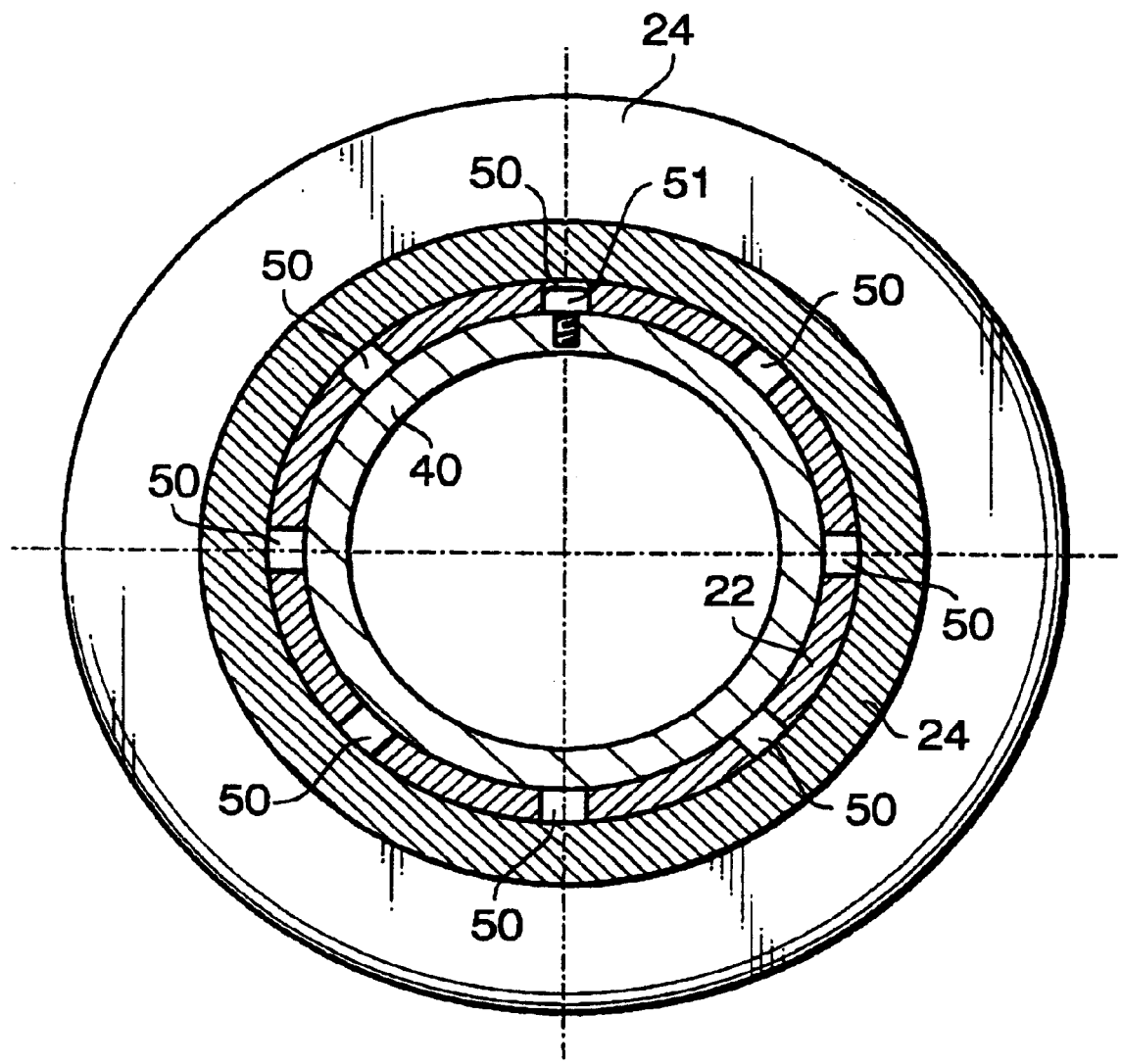
FIG. 8 shows the cross-section view along line VIII—VIII shown in FIG. 6.

FIGS. 6 to 8 show an eyepiece attachment structure according to a second embodiment of the invention.

FIG. 8, which is a partially cross-sectional view taken along line VIII—VIII of FIG. 6, shows eight slits 50 formed on a rear end portion of a holding ring 22, disposed at substantially even intervals along the circumference. Each of the slits 50 opens rearward. Similarly to the first embodiment, by rotating the operation ring 24, the holding ring 22 can be elastically constricted.

There is provided a rotation preventing pin 51, on an attaching sleeve 40 of the eyepiece 12Z. The rotation preventing pin 51 projects outward in a radial direction of the attaching sleeve 40. The rotation preventing pin 51 is formed so as to be fitted into any one of the slits 50.

When the eyepiece 12Z is inserted, in an arrow A direction, in the fixing cylinder 21 as shown in FIG. 7, i.e., the attaching sleeve 40 is inserted into the holding ring 22, of a fixing cylinder 21 and of a protecting ring 25 until the insertion stopping surface 39 contacts the rear end surface of the holding ring 22, the rotation preventing pin 51 engages with one of the slits 50 on the holding ring 22. Since the rotation preventing pin 51 engages with one of the slits 50, the attaching sleeve 40 is prevented from rotating with respect to the fixing cylinder 21.

The holding ring 22 is supported by the fixing cylinder 21 in a housing body 20, and the rotation preventing pin 51 is securely fixed on the attaching sleeve 40 (i.e., on the fixed cylinder 30) of the eyepiece 12Z. Therefore, the rotation preventing pin 51 and the slit 50 are engaged with each other so that the eyepiece 12Z (fixed cylinder 30) is fixed and does not rotate in the scope body 11. If the rotation preventing pin 51 contacts the rear end of the holding ring 22, which prevents further insertion, by rotating the eyepiece 12Z by less than 45 degrees, at the largest, it becomes possible that the pin 51 can be inserted in one of the slits 50. This is because eight grooves are formed on the holding ring 22 disposed at the equal distance along its circumference in the embodiment.

After the rotation preventing pin 51 is inserted into the slit 50, an operation ring 24 is rotated in the tightening direction. Then, the operation ring 24 moves forward, and a pressing surface 24a presses a pressed surface 22a. The holding ring 22 is constricted in the radial direction, causing a protection element 25 to be pressed. Then the inside surfaces of the protecting element 25 press the outer circumferential surface of the attaching sleeve 40 for frictionally engaging the attaching sleeve 40. Thus the eyepiece 12Z is attached to the body 11. The rotation preventing pin 51 is inserted into one of the slits 50.

When the eyepiece 12Z is to be withdrawn from the scope body 11, the operation ring 24 is rotated in the loosening direction to loosen the engagement.

One of the slits 50 and the rotation preventing pin 51 engage each other when the eyepiece 12Z is attached, according to the second embodiment. Therefore, the zooming operation does not make the entire eyepiece 12Z (i.e., fixed cylinder 30) rotate, providing a comfortable operation. Since the slits 50, which are originally provided for expanding and constricting the holding ring 22, function as rotation preventing grooves of the scope body 11, there is no need to provide an extra mechanism or element on the scope body 11 for preventing the rotation of the eyepiece 12Z. Thus, the structures can be made relatively simple.

In the non-zooming type eyepiece 12N which does not have an operating element as shown in FIG. 5 is attached, there is no need to provide any rotation preventing element on either the eyepiece 12N or the scope body 11. so that the eyepiece 12N can be detached from and attached to the scope body 11 by the same operation as in a conventional collet type attachment structure.

Figure 9:
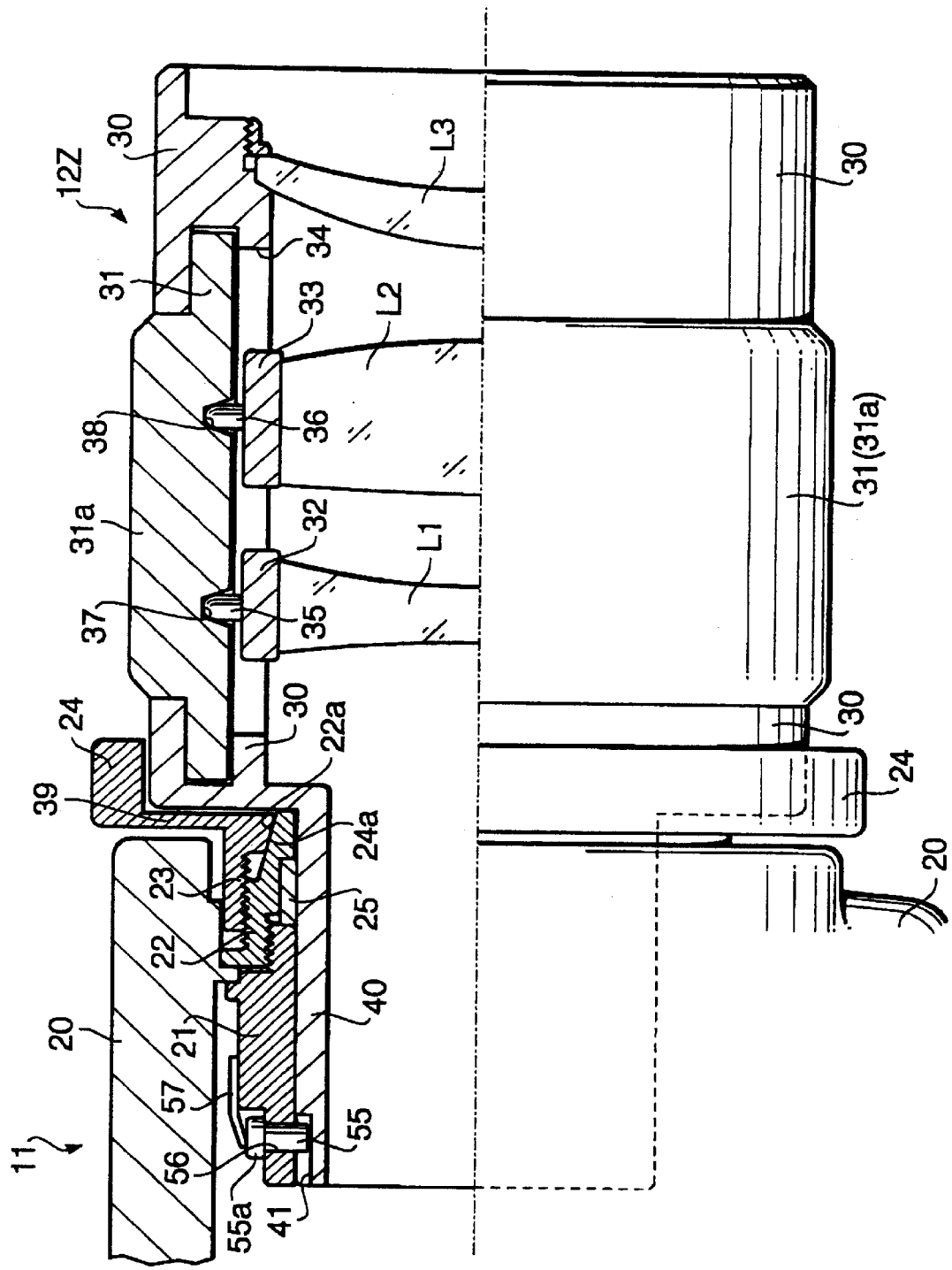
FIG. 9 shows a side view, with an upper side cross-sectioned, of a third embodiment of an eyepiece attachment structure, with a zooming type eyepiece attached.
Figure 10:
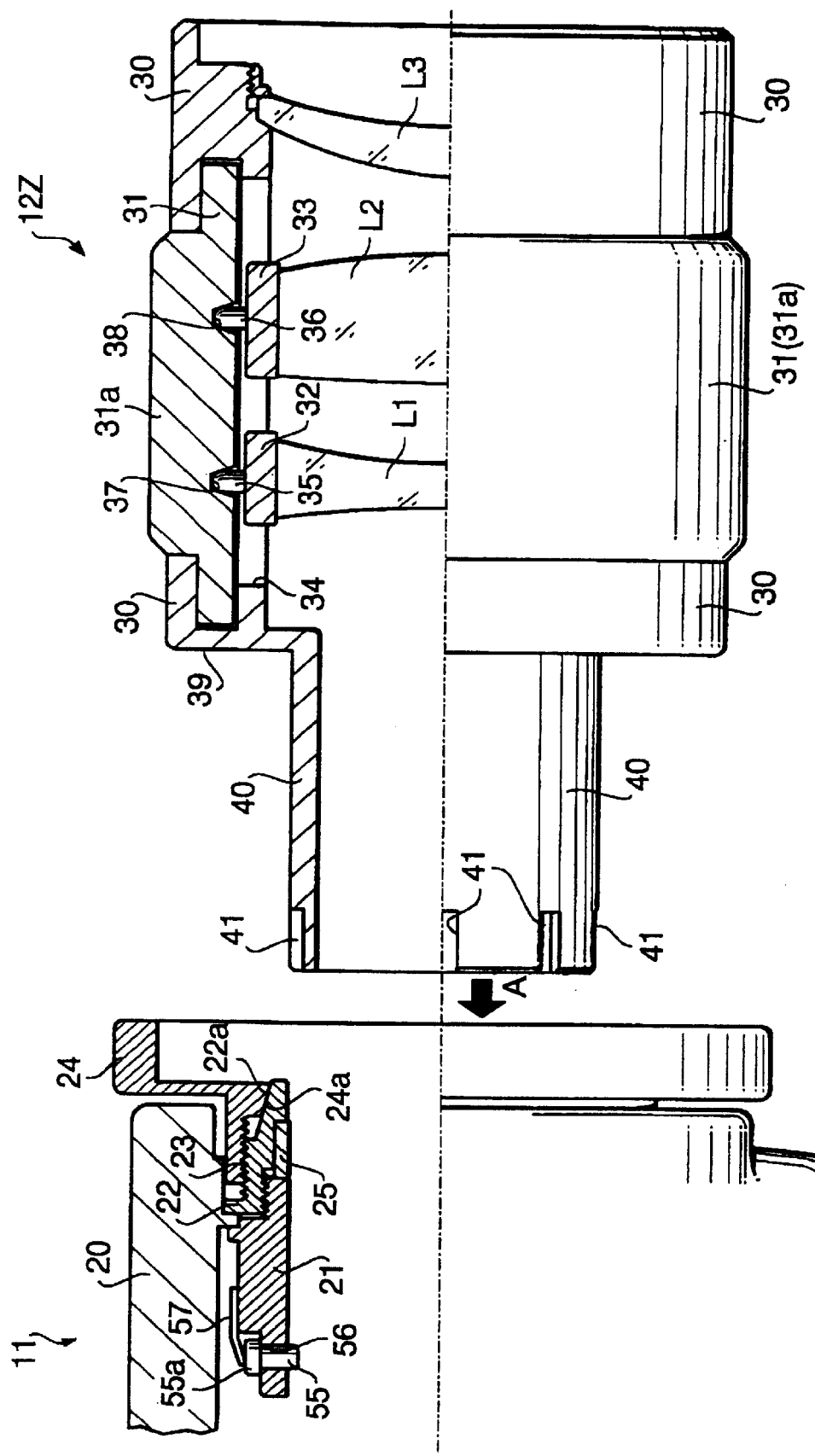
FIG. 10 is the side view, with the upper side cross-sectioned, of the eyepiece attachment structure, with the eyepiece detached.
Figure 11:
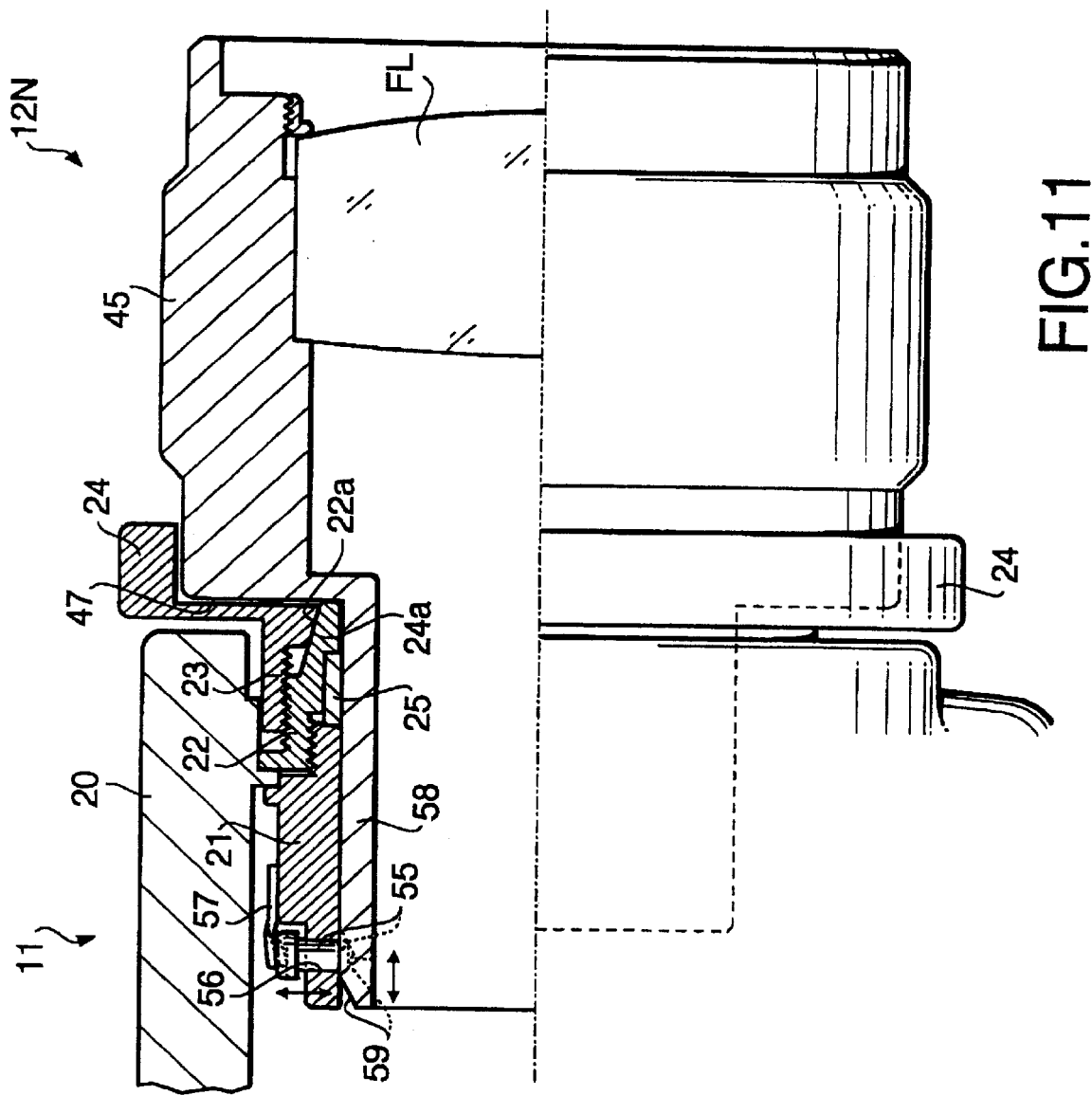
FIG. 11 shows the side view, with the upper side cross-sectioned, of the third embodiment of the eyepiece attachment structure, with a non-zooming type eyepiece attached.

FIGS. 9 to 11 show an eyepiece attachment structure according to a third embodiment the invention. This embodiment differs from the first embodiment in that a rotation preventing pin 55 is provided on a scope body 11 instead of the pin 26, and the pin 55 is moveable in a radial direction.

As shown in FIG. 9, the rotation preventing pin 55 is movably inserted through a through hole 56 provided at a front end portion of a fixing cylinder 21. A leaf spring 57 is provided on the fixing cylinder 21 to bias the rotation preventing pin 55 inward. A pinhead 55a is formed on the rotation preventing pin 55, and the pin 55 is inserted in the through hole 56 until the pinhead 55a contacts an outer circumferential surface of the fixing cylinder 21 (as shown in FIG. 9 and 10). A tip-end portion of the rotation preventing pin 55 engages one of the rotation preventing grooves 41, the engagement preventing the eyepiece 12Z from rotating with respect to the body 11. In this respect, the biased position of the rotation preventing pin 55, as shown in FIG. 9, is referred to as a locking position. By applying force to move the rotation preventing pin 55 upward, the pin 55 can be moved outward such that the tip end thereof is retracted from the inside of the fixing cylinder 21 (see FIG. 11). This retracted position of the pin 55 will be referred to as an unlocked position.

FIG. 10 shows that the rotation preventing pin 55 is held in the locked position biased by the leaf spring 57, with the eyepiece 12Z detached. When the eyepiece 12Z is moved forward (i.e., inserted in the body 11) as shown by arrow A, the attaching sleeve 40 is inserted into the holding ring 22 (i.e., the fixing cylinder 21). A rotation preventing groove 41 is formed at the front end of the attaching sleeve 40. Accordingly, as the attaching sleeve 40 is inserted, the rotation preventing groove 41 and the rotation preventing pin 55 may be engaged as shown in FIG. 9. Then, the insertion stopping surface 39 of the eyepiece 12Z contacts a rear end of a holding ring 22 and further insertion is prevented. Then, an operation ring 24 is rotated in a tightening direction to move the operation ring 24 forward. This operation causes constricting of the holding ring 22 and the protecting ring 25. A frictional engagement is established between the protecting element 25 and the attaching sleeve 40 so that the eyepiece 12Z will not be withdrawn. Since the rotation preventing pin 55 engages the rotation preventing groove 41, the whole eyepiece 12Z will not be rotated even if the rotating ring 31 is rotated for zooming.

If none of the rotation preventing grooves 41 is located at a position where the rotation preventing pin 55 protrudes, the rotation preventing pin 55 contacts a front end of the attaching sleeve 40, stopping the insertion. However, since eight rotation preventing grooves 41 are formed at substantially even intervals along the circumference at the front end of the attaching sleeve 40, one of the rotation preventing grooves 41 can easily be inserted, by rotating the eyepiece 12Z less than 45 degrees, at the largest. When the eyepiece 12Z is withdrawn, the operation ring 24 is rotated in the loosening direction to release the frictional engagement. The rotation preventing pin 55 remains in the locked position after the eyepiece 12Z has been removed.

FIG. 11 shows a case where a fixed-focus eyepiece 12N attached to the body 11 according to the third embodiment. According to the third embodiment, the eyepiece 12N has an attaching sleeve 58, the axial length of which is substantially the same as the attaching sleeve 40 of a zooming type eyepiece 12Z. A pin-lifting surface 59 is provided at a front end of the attaching sleeve 58 as shown in FIG. 11. The pin-lifting surface 59 is formed as a tapered surface which inclines toward the axis of the attaching sleeve 58 at the front end portion.

When the fixed-focused eyepiece 12N is to be attached to the scope body 11, the attaching sleeve 58 is inserted into the holding ring 22, the protecting ring 25 and a fixing cylinder 21, and the pin-lifting surface 59 contacts the rotation preventing pin 55. As the pin-lifting surface 59 is further inserted, the rotation preventing pin 55 is pressed upward by the pin-lifting surface 59 and projects outward through the through hole 56 against the biasing force of the leaf spring 57. The rotation preventing pin 55 is finally retracted from the inside of the fixing cylinder 21 by the pressing surface 59, which is the unlock position. After the attaching sleeve 58 is fully inserted into the fixing cylinder 21 as illustrated in FIG. 11, the operation ring 24 is rotated in the tightening direction for fixing the eyepiece 12N. Thus, the rotation preventing pin 55 does not interfere the attachment of a conventional eyepiece which is not provided with a rotation preventing slit.

When the eyepiece 12N is to be detached from the scope body 11, the operation ring 24 is rotated in the loosening direction for loosening the frictional engagement with the attaching sleeve 58. As the attaching sleeve 58 is moved backward, the rotation preventing pin 55 returns to the locked position by the biasing force of the leaf spring 57.

In the third embodiment employing a zooming type eyepiece, since the rotation preventing groove 41 engages the rotation preventing pin 55 when the eyepiece is attached, the zooming operation does not cause the whole eyepiece 12Z (i. e. the fixed cylinder 30) to rotate, thus providing a comfortable operation.

Since the rotation preventing pin 55, provided on the scope body 11, is movable between the locked and unlocked positions in the embodiment, the eyepiece 12N provided with no rotation preventing slit can also be attached. Therefore, regardless of the axial length of the attaching sleeve, various kinds of eyepieces can be attached.

Such an inclined surface as the pin-lifting surface 59 of the eyepiece 12N may also be provided in the front end of the attaching sleeve 40 of the eyepiece 12Z. In such a case, if a rotation preventing slit 41 is engaged with the rotation preventing pin 55 when the eyepiece 12Z is attached, the rotation of the eyepiece 12Z is duly prevented. If the rotation preventing pin 55 is engaged with none of the rotation preventing slits 41, the pin-lifting surface 59 pushes the rotation preventing pin 55 upward to the unlocked position. Thereafter, by rotating the eyepiece 12Z, the rotation preventing pin 55 engages one of the rotation preventing slits 41, and the leaf spring 57 biases the rotation preventing pin 55 toward the locked position for engaging, resulting in preventing the eyepiece 12Z from rotating.

Figure 12:
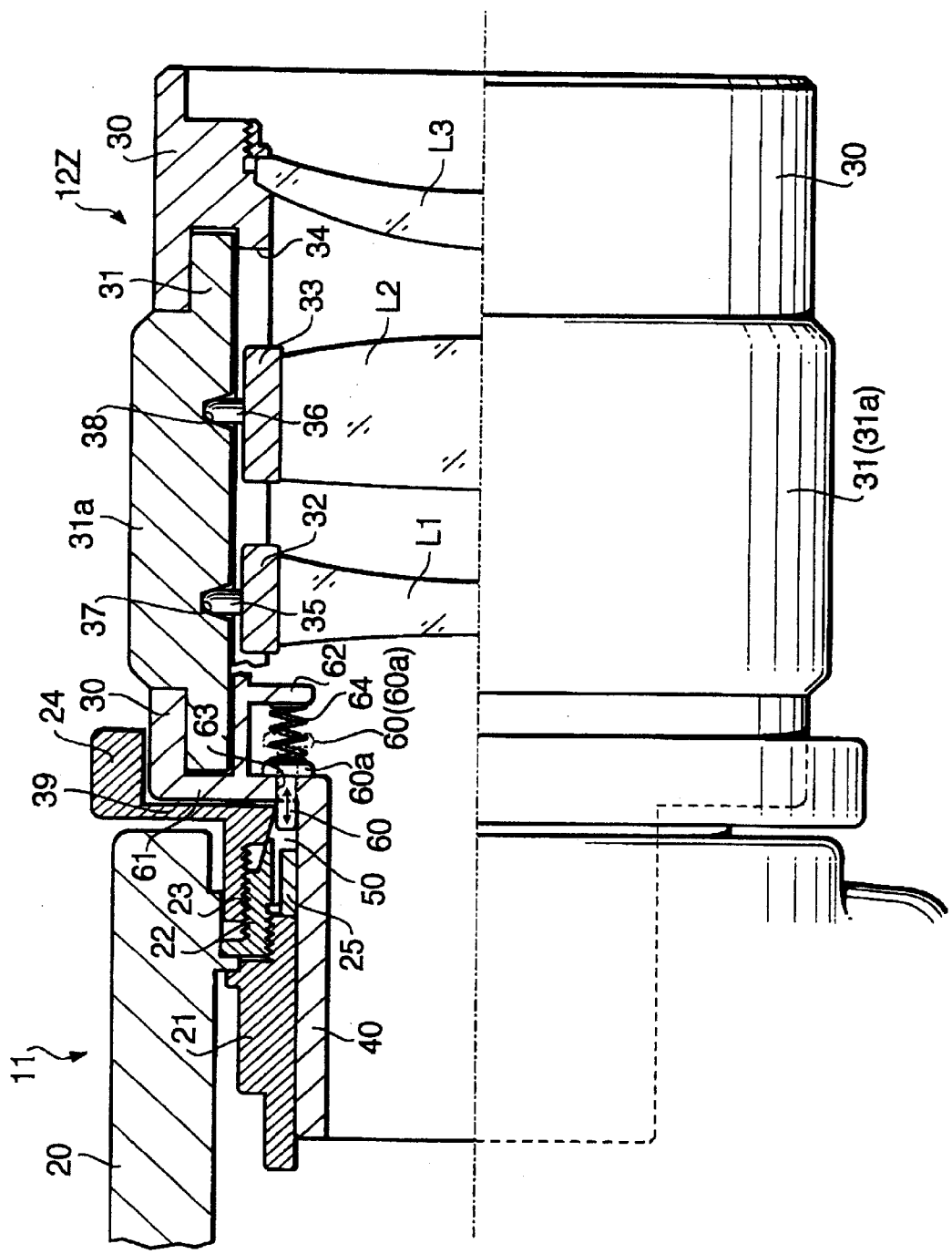
FIG. 12 shows a side view, with an upper side cross-sectioned, of a fourth embodiment of an eyepiece attachment structure, with a zooming type eyepiece attached.
Figure 13:
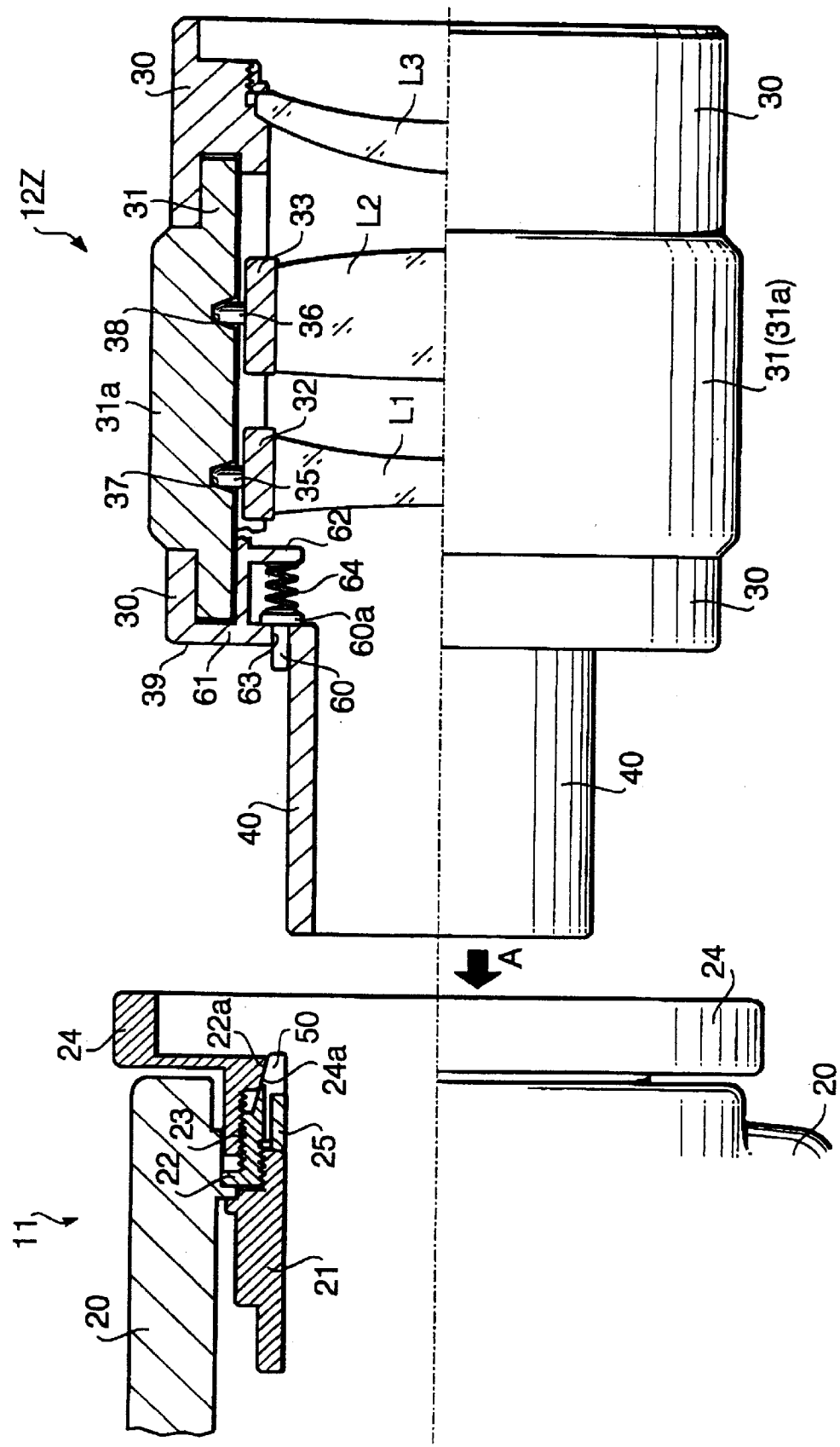
FIG. 13 shows the side view, with the upper side cross-sectioned, of the eyepiece attachment structure, the eyepiece being detached.

FIG. 12 and 13 show an eyepiece attachment structure according to a fourth embodiment of the invention. This embodiment differs from the third embodiment in that a rotation preventing pin 60, which can be moved in a direction parallel to the optical axis to be located at locking and unlocking positions, is provided on an eyepiece 12Z.

A fixed cylinder 30 employed in the eyepiece 12Z is provided with a front wall 61, an inner flange 62, and a through hole 63. The through hole 63 penetrates the front wall 61 in parallel with the optical axis. A. shaft of the rotation preventing pin 60 is inserted through the through hole 63, and movably supported thereby. A pinhead 60*a* of the rotation preventing pin 60 is located between the front wall 61 and the inner flange 62. When the pinhead 60*a* contacts the front wall 61, the rotation preventing pin 60 is located in a locked position, where the tip end of the shaft of the rotation preventing pin 60 is projected forward out of the insertion stopping surface 39 as shown in FIG. 13. A coil spring 64 is provided between the pinhead 60*a* and the inner flange 62 for biasing the rotation preventing pin 60 to locate at the locked position. When the rotation preventing pin 60 moves to the unlocked position, the coil spring 64 is pushed, as shown by a broken line in FIG. 12. In the unlocked position, the shaft of the rotation preventing pin 60 is retracted in the through hole 63, and does not project forward from insertion stopping surface 39.

When the eyepiece is detached from the body 11, as shown in FIG. 13, the rotation preventing pin 60 is in the locked position as being biased by the coil spring 64. When the eyepiece 12Z is moved in the direction of arrow A, the attaching sleeve 40 is inserted into the holding ring 22, protecting ring 25 and fixing cylinder 21. Therefore, the shaft of the rotation preventing pin 60, projecting from the insertion stopping surface 39, may engage one of the slits 50 formed on the holding ring 22 (FIG. 12). After the rotation preventing pin 60 is inserted in the slit 50, the insertion stopping surface 39 of the eyepiece 12Z contacts the rear end of the holding ring 22, and further insertion is prevented. An operation ring 24 is then rotated in a tightening direction for securing the eyepiece 12Z. Since the rotation preventing pin 60 is engaged with one of the slits 50, the fixed cylinder 30 is prevented from rotating. Therefore, even if the rotating ring 31 for zooming is rotated, the eyepiece 12Z does not rotate.

The eyepiece 12Z can be removed by rotating the operation ring 24 in the loosening direction, thereby releasing the frictional engagement with the attaching sleeve 40. The rotation preventing pin 60 is held at the locked position by the biasing force of coil spring 64 even after the eyepiece 12Z is withdrawn from the body 11.

The rotation preventing pin 60 is movable in the direction of insertion and withdrawal of the eyepiece 12Z, and therefore if the rotation preventing pin 60 is not located at a position corresponding to the slits 50, the front end of the rotation preventing pin 60 contacts the rear end of the holding ring 22. In such a case. by rotating the fixed cylinder 30 while slightly pushing the eyepiece 12Z forward, the rotation preventing pin 60 can engage with one of the slits 50.

One of the slits 50 is engaged with the rotation preventing pin 60 when the eyepiece is attached so that the whole of the eyepiece 12Z does not rotate even when the zooming operation is executed in the fourth embodiment, which provides a comfortable operation. The slits 50 allow for easy expansion and constriction of the holding ring 22, which is the same configuration as that of the second embodiment. Therefore, no specific mechanism or element is necessarily provided on the scope body 11 for preventing the rotation of the eyepiece, resulting in a more simplified constitution. If a fixed focus type eyepiece 12N is to be attached to the fourth embodiment, no specific rotation preventing element is provided either on the eyepiece 12N or the scope body 11, so that the eyepiece 12N can be attached in the same operation as that of a conventional collet type attachment structure. That makes various types of eyepieces applicable to the fourth embodiment.

As the rotation preventing pin 60 moves parallel to the optical axis in the fourth embodiment, the diameter of the eyepiece 20 can be made smaller, which does not interfere with the observation light.

According to the eyepiece attachment structures of the embodiments, a collet type attachment structure is provided with any rotation preventing structure on the eyepiece or scope body. Therefore, the eyepiece is prevented from rotating, even when a rotating torque like a torque generated by the zooming operation is applied, which provides comfortable operation feel. Moreover, conventional type eyepieces, which are not provided with rotational preventing structure, can also be attached to the scope body in any one of the embodiments. Therefore, general versatility of the attachment structures according to the invention is high.

Although the structure and operation of the eyepiece attachment structure is described herein with respect to the preferred embodiments, many modifications and changes can be made without departing from the spirit and scope of the invention. For example, the rotation preventing mechanism of the attachment structure is applicable not only to an eyepiece with a rotatable operating member (12Z), but to an eyepiece which is not provided with a rotatable operating member (12N). It is preferable that any type of eyepiece is prevented from inadvertent rotation, which provides a comfortable operation feeling. Moreover, the rotatable operating member may well be a dioptric lens and the like, other than a zooming lens. Furthermore, the number and circumferential locations of the rotation preventing pins and slits (or grooves) that constitute the rotation preventing mechanism are arbitrarily determined.

The present disclosure relates to the subject matter contained in Japanese Patent Application No. 2000-056080, filed on Mar. 1, 2000, which is expressly incorporated herein by reference in its entirety.

What is claimed is:

1. An eyepiece attachment structure for attaching an eyepiece to an observation optical instrument, comprising:
    an attaching sleeve protruding from said eyepiece;
    a holding member secured to a body of said observation optical instrument, said holding member frictionally holding said attaching sleeve when said attaching sleeve is inserted in said observation optical instrument; and
    a rotation preventing mechanism that mechanically prevents rotation of said attaching sleeve relative to said holding member when said attaching sleeve is inserted into said observation optical instrument.

2. The eyepiece attachment structure according to claim 1, wherein said holding member includes:
    an elastically constrictable holding ring in which said attaching sleeve is inserted;
    an operating ring that is engageable with said holding ring, said holding ring being constricted upon operation of said operating ring; and
    a protecting element provided inside said holding ring, said protecting element frictionally engaging with said attaching sleeve when said holding ring is constricted.

3. The eyepiece attachment structure according to claim 1, wherein, said rotation preventing mechanism comprises:
    at least one rotation preventing groove provided on one of said eyepiece and said body; and
    at least one rotation preventing pin engageable with said at least one rotation preventing groove, said at least one rotation preventing pin being provided on the other one of said eyepiece and said body.

4. The eyepiece attachment structures according to claim 3, wherein, said at least one rotation preventing pin is provided on said body, said at least one rotation preventing pin projecting inward in a radial direction of said holding member, and wherein said at least one rotation preventing groove is formed at a front end portion of said attaching sleeve by cutting at least one portion of its outer circumferential surface.

5. The eyepiece attachment structure according to claim 4, wherein another eyepiece having another attaching sleeve is attachable with said attachment structure, the length of said another attaching sleeve along its axis being shorter than that of said attaching sleeve, and
    wherein said another attaching sleeve does not interfere with said rotation preventing pin in an axial direction.

6. The eyepiece attachment structure according to claim 4, wherein said rotation preventing pin is movable between a locked position, at which said at least one rotation preventing pin engages said at least one rotation preventing groove, and an unlocked position, at which said at least one rotation preventing pin does not engage said at least one rotation preventing groove, and
    wherein said eyepiece attachment structure includes a biasing means that biases said rotation preventing pin to be neutrally located at said locked position.

7. The eyepiece attachment structure according to claim 6, wherein said rotation preventing pin is movable in the radial direction of said holding member to locate between said locked position and said unlocked position, said rotation preventing pin being biased to neutrally locate at said locked position,
    wherein another eyepiece having another attaching sleeve is attachable with said attachment structure, said another attaching sleeve being provided with a pin-lifting surface, said rotation preventing pin being lifted by said pin-lifting surface to locate at said unlocked position upon insertion of said another attaching sleeve into said holding member.

8. The eyepiece attachment structure according to claim 2, wherein said at least one rotation preventing groove includes a plurality of slits formed on said holding ring which enable said holding ring to be elastically constricted, and said rotation preventing pin is provided on one of said attaching sleeve and a member integrally formed with said attaching sleeve.

9. The eyepiece attachment structure according to claim 8, wherein said at least one rotation preventing pin is movable between a locked position, at which said at least one rotation preventing pin engages said at least one rotation preventing groove, and an unlocked position, at which said at least one rotation preventing pin does not engage said at least one rotation preventing groove, and wherein said eyepiece attachment structure includes a biasing means that biases said rotation preventing pin to be neutrally located at said locked position.

10. The eyepiece attachment structure according to claim 9, wherein said rotation preventing pin is movable in a direction parallel to an insertion and withdrawal direction of said attaching sleeve with respect to said body.

11. The eyepiece attachment structure according to claim 1, wherein, said eyepiece comprises:

a fixed cylinder integrally formed with said attaching sleeve; and a rotatable ring manually operable from outside, said rotatable ring being rotatably supported by said fixed cylinder.

12. The eyepiece attachment structure according to claim 11, wherein said rotatable ring is a zooming operation ring, upon operation of said zooming operation ring, magnification-varying lens groups, supported in said eyepiece, move along an optical axis to vary the focal length of said eyepiece.

* * * * *